United States Patent [19]
Abernethy

[11] Patent Number: 5,525,981
[45] Date of Patent: Jun. 11, 1996

[54] CORDLESS DIGITIZER TRANSDUCER/CURSOR STATUS TRANSMISSION APPARATUS AND METHOD

[75] Inventor: Brian L. Abernethy, Pheonix, Ariz.

[73] Assignee: CalComp Inc., Anaheim, Calif.

[21] Appl. No.: 282,822

[22] Filed: Jul. 29, 1994

Related U.S. Application Data

[63] Continuation of Ser. No. 828,181, Jan. 30, 1992, abandoned.

[51] Int. Cl.$^6$ ................................................. H03M 11/00
[52] U.S. Cl. ........................ 341/34; 341/20; 340/825.68; 178/18
[58] Field of Search .................................. 341/34, 22, 20; 178/18, 19, 20; 364/174, 175; 340/825.68, 825.69

[56] References Cited

U.S. PATENT DOCUMENTS

| | | | |
|---|---|---|---|
| 3,510,777 | 5/1970 | Gordon | 340/825.68 |
| 4,213,005 | 7/1980 | Cameron | 178/18 |
| 4,345,239 | 8/1982 | Elliot | 178/19 |
| 4,451,698 | 5/1984 | Whetstone et al. | 178/19 |
| 4,672,154 | 6/1987 | Rodgers et al. | 178/19 |
| 4,820,886 | 4/1989 | Watson | 178/19 |
| 5,061,828 | 10/1991 | Purcell | 178/19 |
| 5,111,005 | 5/1992 | Smith et al. | 178/19 |
| 5,144,594 | 9/1992 | Gilchrist | 178/18 |
| 5,247,138 | 9/1993 | Landmeier | 178/19 |

Primary Examiner—John K. Peng
Assistant Examiner—Andrew Hill
Attorney, Agent, or Firm—William F. Porter, Jr.; Michaelson & Wallace

[57] ABSTRACT

A cordless transducer/cursor having a transmitter for use in conjunction with the receiver of a digitizer tablet. The transmitter receives parallel binary signals representing the status of non-positional functions such as command button status and the pressure applied to a stylus of the transducer/cursor and converts these into a serial stream of binary data for electrostatic or electromagnetic transmission to the receiver which, in turn, converts the serial stream into a plurality of parallel binary signals consistent with those received and converted by the transmitter.

9 Claims, 2 Drawing Sheets

CORDLESS DIGITIZER TRANSDUCER/CURSOR STATUS TRANSMISSION APPARATUS AND METHOD

This is a continuation of application Ser. No. 07/828,181 filed Jan. 30, 1992, abandoned.

BACKGROUND OF THE INVENTION

This invention relates to a digitizer tablet employing a cordless transducer/cursor and, more particularly, in a cordless digitizer system in which the position of a cordless transducer/cursor on a tablet is,determined electromagnetically by means of a signal transmitted from the transducer/cursor to the tablet at a frequency, to apparatus for wirelessly transmitting the status of a non-positional function of the transducer/cursor to the tablet comprising, status means for representing the status of the non-positional function of the transducer/cursor as a binary number comprising at least one parallel binary bit; a parallel-to-serial shift register connected to receive the binary number in parallel and output a serial stream of binary pulses representing the binary number; and, wireless transmission means for separately transmitting the serial stream of binary pulses.

The typical prior art digitizer has a tablet and a transducer/cursor in the form of a pen or a puck. The position of the transducer/cursor on the surface of the tablet is sensed and an operator's desire to accomplish one or more tasks is signaled by operating button activated switches or by pressing the transducer/cursor (in the case of a pen) against the tablet to operate an associated pressure-activated switch. Early transducer/cursors were connected to the tablet by means of a multi-conductor cable through which the positional and button/pressure information flowed virtually without problem.

More recently, cordless transducer/cursors have become popular. Prior art cordless transducer/cursors have attempted to use phase and/or frequency changes to transmit the non-positional status of the transducer/cursor with respect to such things as buttons pushed, pen pressure, or the like. Unfortunately, phase and frequency changes are very prone to false reading resulting from outside influences such as metal objects in the area, noise, etc.

Wherefore, it is an object of the present invention to provide a cordless digitizer transducer/cursor in which wireless transmission of a serial digital data stream is used to indicate non-positional transducer/cursor status information.

It is a further object of the present invention to provide such a cordless digitizer transducer/cursor in a reliable lowpower, low price format.

It is a further object of the present invention to provide a method of wirelessly transmitting non-positional transducer/cursor status information from a transducer/cursor to an associated digitizing tablet which is error resistant.

Other objects and benefits of the invention will become apparent from the detailed description which follows hereinafter when taken in conjunction with the drawing figures which accompany it.

SUMMARY OF THE INVENTION

The foregoing objects have been achieved by the cordless transducer/cursor of the present invention for wirelessly transmitting the status of a non-positional function of the transducer/cursor to a tablet comprising, status means for representing the status of the non-positional function of the transducer/cursor as a binary number comprising at least one parallel binary bit; a clock producing a regular series of clock pulses; a parallel-to-serial shift register connected to receive the binary number in parallel and output a serial stream of binary pulses representing the binary number and synchronized to the clock pulses; and, output means for wirelessly transmitting the serial stream of binary pulses.

The output means can operate electostatically, or electromagnetically by way of example. Typically, the status means comprises at least one button actuated switch. The status means may also comprise a pressure-to-digital converter outputting a parallel binary signal indicating levels of pressure being exerted on the cordless transducer/cursor.

Preferably, the cordless transducer/cursor is in combination with a digitizer tablet for receiving the serial stream of binary pulses wirelessly transmitted from the transducer/cursor wherein the tablet includes receiver means for receiving the serial stream of binary pulses wirelessly transmitted from the transducer/cursor; clock recreation means for providing pulses which are synchronous with the clock pulses to which the serial stream of binary pulses were synchronized; and, a serial-to-parallel shift register receiving the serial stream of binary pulses from the receiver mean and producing in combination with the pulses from the clock recreation means a parallel binary output corresponding the binary number from the status means.

BRIEF DESCRIPTION OF THE DRAWINGS

The present invention will now described, by way of example, with reference to the accompanying drawings, in which.

DETAILED DESCRIPTION OF THE INVENTION

Figure 1:
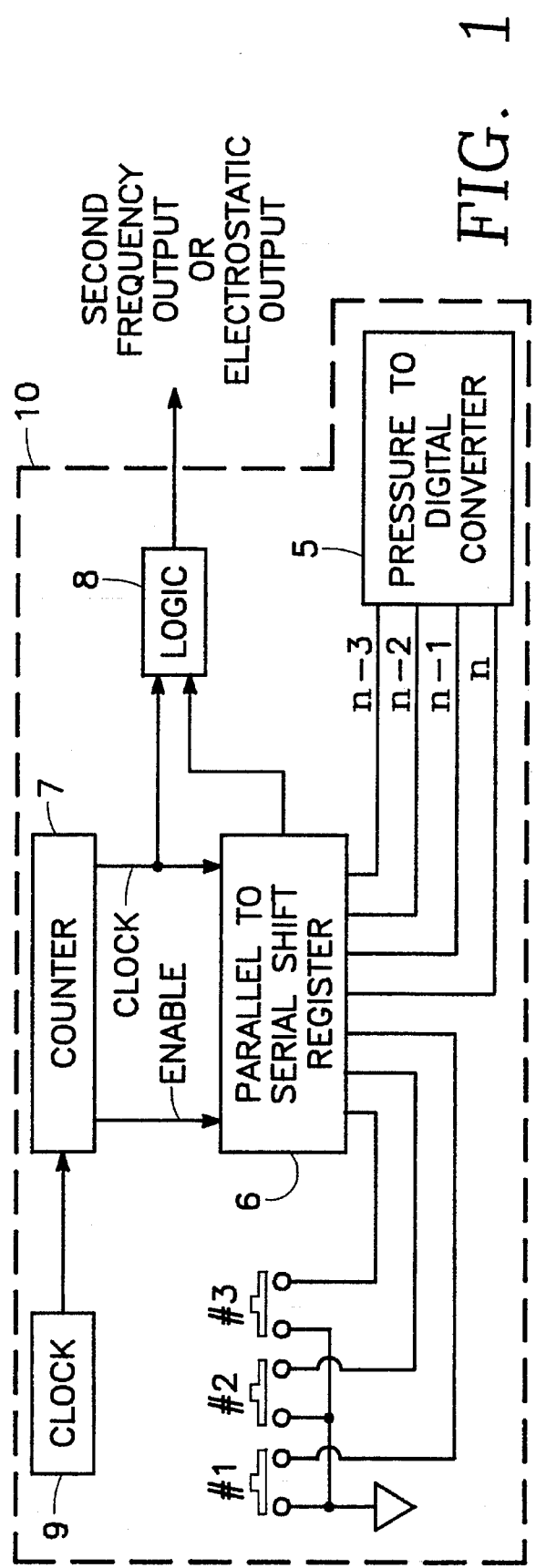
FIG. 1 is a block diagram of the transmitter section of the present invention.

As will be recognized and appreciated by those skilled in the art, in addition to the attributes of high reliability through an increased signal-to-noise ratio achieved thereby, the present invention as described hereinafter also allows the transducer/cursor to transmit the status of a virtually unlimited number of factors. Thus, certain items will be described in the specification which follows and the drawing figures associated therewith by way of example only and it is to be understood that the use of a specific number of button-activated switches or sensed pressure levels is not intended to be limiting in any way. Similarly, the use of a "pen" type transducer/cursor is for convenience only and the techniques employed therewith could equally be employed with a "puck" type of transducer/cursor. Therefore, the appended claims should be given a breadth in keeping with the scope and spirit of the invention described herein. It should be understood when reading the description which follows hereinafter that the most basic point of novelty of the present invention is the use of a separate serial digital data stream to transmit the status of certain non-positional attributes of a cordless digitizer's transducer/cursor to the associated tablet in lieu of prior art analog techniques involving phase and/or frequency changes to the signal used for the transmitting of positional information. In the preferred embodiment as implemented with digitizing apparatus as manufactured by the assignee of this application in which the position of the cordless transducer/cursor on the tablet is determined electromagnetically by means of a signal transmitted from the transducer/cursor to the tablet at a frequency, the separate transmission of the status serial digital data stream in accomplished electrostatically or electromagnetically.

Figure 2:
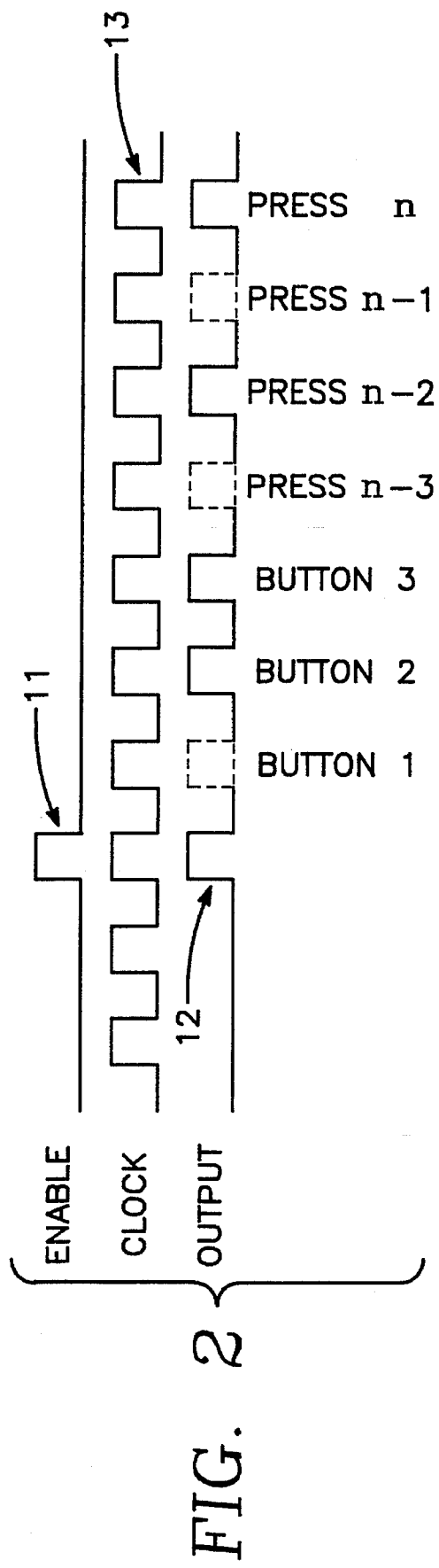
FIG. 2 exemplifies the serial data transmission stream produced by the transmitter of FIG. 1.

With reference first to FIGS. 1 and 2, a digitizer transducer/cursor 10 of the pen type includes a transmitter circuit for transmitting a digital data stream signaling the status of the three button-actuated switches designated as #1, #2 and #3, which are manually operable by a user to initiate desired functions associated therewith, and a digital signal representing the pressure being applied by the transducer/cursor 10. The pressure signal is produced by a pressure-to-digital converter 5 which produces, for example, a four-bit binary signal which can represent sixteen magnitudes of pressure (i.e. 0000 through 1111). More or fewer levels of pressure could, of course, be indicated by the use of more or fewer bits as well known to those skilled in the art.

Operation of the switches 1#, #2 and #3 connects respective inputs of a parallel-to-serial shift register 6 to ground, thus signalling the actuation of those switches. The four binary outputs from the pressure-to digital converter 5 are supplied to four associated inputs of the parallel-to-serial shift register 6 which, under the control of a counter 7, converts the detected status of the switches #1, #2 and #3 and the four binary outputs from the converter 5 into a serial digital data stream. This stream is fed to a logic circuit 8 which, in turn, transmits that serial stream of data as an electrostatic or electromagnetic output according to techniques well known in the art. The counter 7 is controlled by a clock 9, which produces a regular sequence of clock pulses, and at an appropriate time, produces an enabling pulse which triggers the register 6 into producing the serial data stream with the first pulse of that stream being the enabling pulse.

In the example shown in FIG. 2, the transmitted output presents a series of clock pulses 13 which, following the initiation of the conversion by receipt of the enabling pulse 11, results in an output from the register 6, commencing with the enabling pulse 11, of a series of pulses 12 synchronous with the clock pulses to indicate, in sequence, the status of switches #1, #2 and #3 and the status of the outputs n-3, n-2, n-1 and n from the converter 5. In the series of pulses of the output 12, the presence of pulses indicates that switches #2 and #3 are being operated and that the transducer/cursor pressure is represented by a binary 1 at n-2 and at n. The absence of a pulse at clock pulse locations indicates that the associated switch(s) or binary outputs are not active.

The electrostatic or electromagnetic transmission of the serial data stream to the digitizer is achieved by technology and in a manner well known in the prior art and thus will not be described herein in the interest of simplicity and the avoidance of redundancy. As those skilled in the art will also readily recognize and appreciate, wireless digital data transmission could also be accomplished in ways other than electrostatically or electromagnetically.

Figure 3:
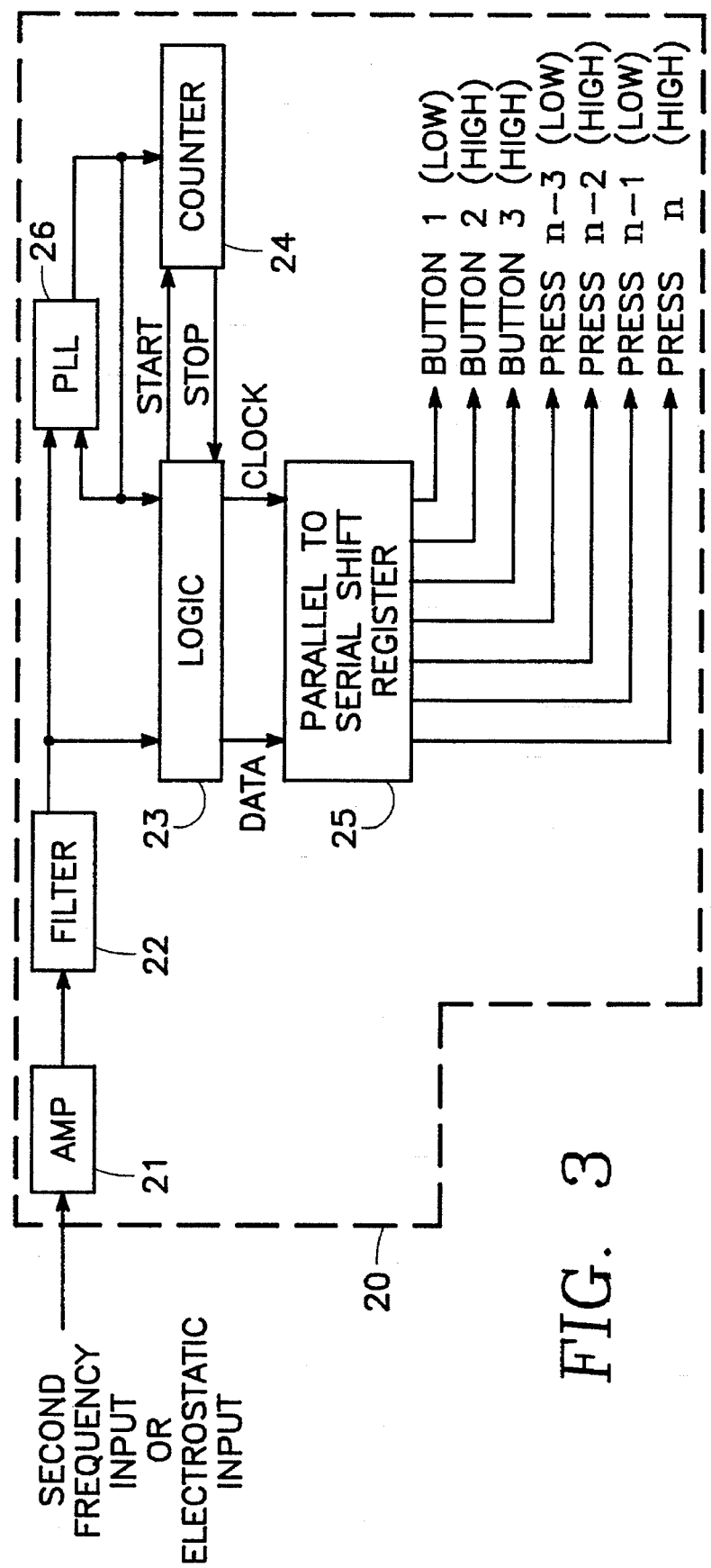
FIG. 3 is a block diagram of a receiver section of the present invention.
Figure 4:
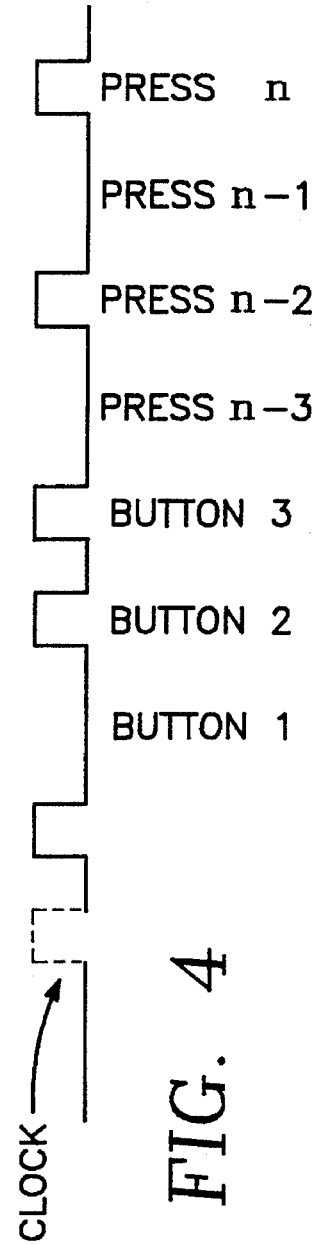
FIG. 4 illustrates the serial data received by the receiver of FIG. 3.

Now with reference to FIGS. 3 and 4, a digitizer 20 includes a receiver of known type for receiving the electrostatically- or electromagnetically- (i.e. wirelessly) transmitted serial data stream and inputting it to an amplifier 21 which supplies the signal, after suitable amplification, by way of a filter 22, to a logic circuit 23 which, under the control of a counter 24, supplies the amplified serial data stream to a serial-to-parallel shift register 25. The seven outputs of register 25 represent the status of switches #1, #2 and #3 and the pressure level represented by the binary signals produced by the converter 5. The logic circuit 23 and counter 24 are synchronized with clock pulses from a phase lock loop 26 which is responsive to the pulses received from the transmitter of FIG. 1.

FIG. 4 illustrates a series of pulses received by the amplifier 21 which corresponds to the series of pulses 12 transmitted by the transmitter according to FIGS. 1 and 2.

The basic method of the present invention involves generating parallel binary signals representing various status parameters of the transducer/cursor of a digitizer (for example, the operational status of command switches and the pressure being applied to the tip of the transducer/cursor), converting these parallel binary signals into a serial stream of binary pulses synchronous with a regular series of clock pulses and representing the parallel binary status, transmitting the serial stream to a receiver by an electrostatic, electromagnetic, or other cordless transmission means, receiving the serial stream, synchronizing the received stream with clock pulses, and converting the serial stream to parallel binary signals representing the transducer/cursor status as originally transmitted.

Thus, there is provided a cordless transducer/cursor for use with the tablet of a digitizer in which a transmitter circuit in the transducer/cursor transmits the status of a plurality of button-operated switches of the transducer/cursor and a binary signal indicating the tip pressure applied by the transducer/cursor to a receiver of the digitizer without the need for physical connection between the transducer/cursor and the tablet. The status of other attributes of the transducer/cursor could, of course, be transmitted to the tablet in like manner.

In tested embodiments of the present invention, the signal-to-noise ratio was found to be significantly higher than with the above-mentioned prior art analog methods of status transmission resulting in the desired substantial increase in reliability and resistance to influence from outside sources.

Wherefore, having thus described the present invention, what is claimed is:

1. In a cordless digitizer system having a cordless transducer/cursor and a digitizer tablet in which the position of a cordless transducer/cursor on the digitizer tablet is determined electromagnetically by means of a positional signal transmitted from the transducer/cursor to the digitizer tablet at a first frequency, a transmitting apparatus disposed in said cordless transducer/cursor for wirelessly transmitting the status of a non-positional function of the cordless transducer/cursor to a receiving apparatus of the digitizer tablet, the transmitting apparatus comprising:

a) status means for representing the status of the non-positional function of the transducer/cursor as a binary number comprising at least one parallel binary bit;

b) a parallel-to-serial shift register connected to receive said binary number in parallel and output a serial stream of binary pulses representing said binary number, wherein the absence of a pulse represents one binary state and the presence of a pulse represents the other binary state; and, c) wireless transmission means for separately transmitting said serial stream of binary pulses other than in conjunction with the positional signal.

2. The transmitting apparatus of claim 1 wherein:
said wireless transmission means transmits said serial stream of binary pulses electrostatically.

3. The transmitting apparatus of claim 1 wherein:
said wireless transmission means transmits said serial stream of binary pulses employing a second frequency.

4. A cordless digitizer system having a cordless transducer/cursor and a digitizer tablet, comprising:

a transmitting apparatus disposed in said cordless transducer/cursor for wirelessly transmitting the status of a non-positional function of the cordless transducer/cursor to a receiving apparatus of the digitizer tablet, the transmitting apparatus comprising, status means for representing the status of the non-positional function of the transducer/cursor as a binary number comprising at least one parallel binary bit, a clock producing a regular series of clock pulses, a parallel-to-serial shift register connected to receive said binary number in parallel and output a serial stream of binary pulses representing said binary number and synchronized to said clock pulses, wherein the absence of a pulse represents one binary state and the presence of a pulse represents the other binary state, and, output means for wirelessly transmitting said serial stream of binary pulses separately, other than in conjunction with a positional signal.

5. A cordless digitizer system according to claim 4, wherein the receiving apparatus of the digitizer tablet comprises:

a) receiver means for receiving said serial stream of binary pulses wirelessly transmitted from the transducer/cursor;

b) clock recreation means for providing pulses which are synchronous with said clock pulses to which said serial stream of binary pulses were synchronized; and, c) a serial-to-parallel shift register receiving said serial stream of binary pulses from said receiver mean and producing in combination with said pulses from said clock recreation means a parallel binary output corresponding said binary number from said status means.

6. A cordless digitizer system according to claim 4 wherein:
said status means comprises at least one button actuated switch.

7. A cordless digitizer system according to claim 4 wherein:
said status means comprises a pressure-to-digital converter outputting a parallel binary signal indicating levels of pressure being exerted on the cordless transducer/cursor.

8. In a cordless digitizer system having a cordless transducer/cursor and a digitizer tablet over which the transducer/cursor is moved, a method for wirelessly transmitting from a transmitting apparatus disposed in said cordless transducer/cursor the status of a non-positional function of the cordless transducer/cursor to a receiving apparatus of the digitizer tablet comprising the steps of:

a) in the transmitting apparatus of the transducer/cursor,
 a1) generating a parallel binary signal representing the status of the non-positional function,
 a2) converting the parallel binary signal into a serial stream of binary pulses synchronous with a series of first clock pulses and representing the parallel binary signal, wherein the absence of a pulse represents one binary state and the presence of a pulse represents the other binary state, and
 a3) wirelessly transmitting the serial stream to the receiving apparatus of the digitizer tablet separately, other than in conjunction with a positional signal; and, b) in the receiving apparatus of the digitizer tablet,
 b1) receiving the serial stream,
 b2) synchronizing the received stream with a series of second clock pulses duplicating the first clock pulses, and
 b3) converting the serial stream to a parallel binary signal representing the status of the non-positional function.

9. In a cordless digitizer system having a cordless transducer/cursor including a plurality of non-positional functions and a digitizer tablet over which the transducer/cursor is moved, a method for wirelessly transmitting from a transmitting apparatus disposed in said cordless transducer/cursor the status of a non-positional function of the cordless transducer/cursor to a receiving apparatus of the digitizer tablet comprising the steps of:

a) in the transmitting apparatus of the transducer/cursor,
 a1) generating a plurality of parallel binary signals representing the status of respective ones of the non-positional functions,
 a2) converting the plurality of parallel binary signals into a common serial stream of binary pulses synchronous with a series of first clock pulses and representing the parallel binary signal, wherein the absence of a pulse represents one binary state and the presence of a pulse represents the other binary state, and
 a3) wirelessly transmitting the serial stream to the receiving apparatus of the digitizer tablet separately, other than in conjunction with a positional signal; and, b) in the receiving apparatus of the digitizer tablet,
 b1) receiving the serial stream,
 b2) synchronizing the received stream with a series of second clock pulses duplicating the first clock pulses, and
 b3) converting the serial stream to a plurality of parallel binary signals representing the status of respective ones of the non-positional functions.

* * * * *